S. W. GOOCH.
FILING MACHINE.
APPLICATION FILED NOV. 11, 1911.

1,047,889.

Patented Dec. 17, 1912.

WITNESSES

INVENTOR

Att'y.

UNITED STATES PATENT OFFICE.

SHADE W. GOOCH, OF NEW BRIGHTON, PENNSYLVANIA, ASSIGNOR TO THE GOOCH-KOEHLER SPECIALTY MANUFACTURING COMPANY, OF ROCHESTER, PENNSYLVANIA, A CORPORATION OF PENNSYLVANIA.

FILING-MACHINE.

1,047,889.     Specification of Letters Patent.     Patented Dec. 17, 1912.

Application filed November 11, 1911. Serial No. 659,711.

*To all whom it may concern:*

Be it known that I, SHADE W. GOOCH, a resident of New Brighton, in the county of Beaver and State of Pennsylvania, have invented a new and useful Improvement in Filing-Machines, of which the following is a specification.

This invention relates to an implement for filing, buffing or polishing, and more particularly to an implement for giving a sidewise movement to a file or other tool.

The object of the invention is to provide a power driven implement for the purpose stated, by means of which more and better work can be done than by hand.

The invention comprises the construction and arrangement of parts hereinafter described and claimed.

Figure 1:
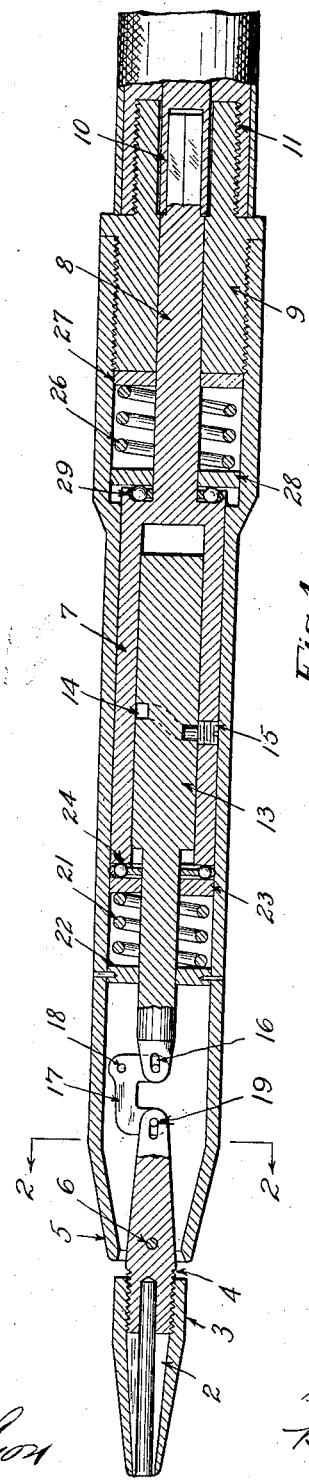
Figure 2:
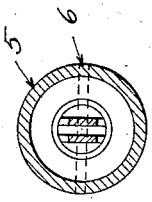

In the accompanying drawing Figure 1 is a longitudinal section through the implement; and Fig. 2 is a cross section on the line 2—2, Fig. 1.

The file or similar tool is adapted to be held by a suitable chuck, that shown comprising spring jaws 2 which are tapered externally and which are pressed radially inwardly by means of an internally tapered sleeve 3 having an engagement with the chuck body at 4. This is a well known type of tool chuck, and its operation will be understood without further description.

The chuck body projects into the forward reduced end of a shell or casing 5 and is pivotally mounted therein, such as on the pin 6. The shell or casing 5 is of general cylindrical form and of a size so that it can be conveniently grasped by the hand in order to manipulate the implement. In this shell is rotatably mounted a cylinder or shell 7 whose rear end is provided with a shank 8 which projects through a bushing or plug 9 closing the rear end of the shell. The end of the shank 8 is square or otherwise formed for the ready connection thereto of a flexible shaft 10. The outer end of the bushing or plug 9 is reduced and externally threaded to receive the casing 11 of the flexible shaft.

Within the rotating shell or cylinder 7 is a reciprocating plunger 13, having a suitable cam connection with the rotating shell or cylinder. As shown the plunger 13 is provided with a spiral cam groove 14 which is engaged by the inner end of a pin 15 threaded in an opening in the shell or cylinder 7. Obviously, the rotation of the shell or cylinder 7 imparts an endwise reciprocating movement to the plunger 13.

The forward end of the plunger 13 has a slot and pin connection at 16 with one arm of an angle lever 17 which is fulcrumed on a pin 18 in the shell 5. The other arm of said angle lever has a slot and pin connection at 19 with the inner end of the tool chuck. Obviously the reciprocating plunger 13 imparts a rocking movement to the angle lever 17, and the latter in turn imparts an oscillating movement to the tool holder or chuck on the pivot 13, so as to give a sidewise or oscillatory movement to the file or other tool held thereby.

The implement is designed particularly for filing the bottoms of cavities in dies, molds, tools and the like, and in doing this work the tool is liable to strike against the walls of the cavity. In order to prevent injury either to the tool or driving parts or strain on the same, I provide suitable yielding means which permits endwise movement of the rotating driving cylinder or shell 7 when the tool meets with undue resistance. As shown, there is provided a spring cushion at each end of said driving cylinder. At the forward end there is a spring 21 interposed between a fixed washer 22 and a movable washer 23, the latter having therein one member of a ball race for the ball bearing 24, the other member of the ball race being in the forward end of the cylinder 7. At the rear end there is a similar spring 26 interposed between the stationary washer 27 and the movable washer 28, said movable washer also having therein one member of the race for the ball bearing 29, the other member of the race being formed in the rear end of the cylinder 7. The springs 21 and 26 are of such strength that for all normal conditions they do not yield, but hold the cylinder against endwise movement in order that the rotation of said cylinder may impart the necessary reciprocating movement to the plunger 13. Should the tool, however, meet undue resistance, such as striking against the walls of a cavity, either one or the other of said springs 21 and 26 will yield and permit endwise movement of the cylinder 7 and prevent injuring and straining the parts.

In use the tool is secured in the chuck and the flexible shaft or other driving connection is attached to the rear end of the shank 8 of the rotating cylinder 7. The implement is manipulated by grasping the shell or casing with the hand. The rotation of cylinder 7 imparts reciprocatory movement to the plunger 13 and this through the angle lever 17 imparts oscillatory movement to the tool holder or chuck. The tool can be guided over the work so as to properly finish all parts thereof. The reciprocation of plunger 13 is very rapid, thereby giving a very rapid movement to the tool. By means of this implement better and much more work can be accomplished than by hand.

What I claim is:

1. In an implement of the character described, the combination of a casing, a rotary member therein having a driving connection through one end of the casing, a tool holder pivoted to said casing, a cam on said rotary member, and connections between said rotary member and tool holder arranged to give the tool holder an oscillatory movement, said connections including a lever independent of the tool holder and independently pivoted to the casing, said lever being actuated from the cam and in turn actuating the tool holder.

2. In an implement of the character described, the combination of a casing, a rotary member therein having a driving connection therethrough, a tool holder in alinement with the axis of the rotary member and pivoted to said casing, and a connection between said rotary member and tool holder arranged to give the tool holder an oscillatory movement, said connection including a cam and an angle lever fulcrumed on the casing and actuated from said cam and having a slot and pin connection with the tool holder.

3. In an implement of the character described, the combination of a casing, a rotary member therein having a driving connection through one end of the casing, a reciprocating member, inter-engaging cam connections between said rotary and reciprocating members, a tool holder pivoted to said casing, operative connections between said reciprocating member and tool holder, and cushions arranged to permit endwise yielding movement of said rotary member when the tool meets with obstruction.

4. In an implement of the character described, the combination of a casing, a rotary member therein having a driving connection through one end of the casing, a tool holder pivotally mounted on the casing, operative connections between said rotary member and tool holder and arranged to give the tool holder an oscillatory movement, and cushions arranged to permit endwise movement of said rotary member when the tool meets with undue obstruction.

5. In an implement of the character described, the combination of a casing, a rotary member therein having a driving connection through one end of the casing, a reciprocating member actuated from said rotary member, a tool holder pivoted to said casing, the axes of said rotary member, said reciprocating member and said tool holder being in alinement, and connections between said reciprocating member and tool holder arranged to give the tool holder an oscillatory movement.

In testimony whereof, I have hereunto set my hand.

SHADE W. GOOCH.

Witnesses:
 L. P. BETTS,
 AMELIA S. KOEHLER.

---

Copies of this patent may be obtained for five cents each, by addressing the "Commissioner of Patents, Washington, D. C."